July 27, 1965 W. LATTEMANN 3,196,899
FEED CONTROL DEVICES
Filed Jan. 19, 1962 4 Sheets-Sheet 2

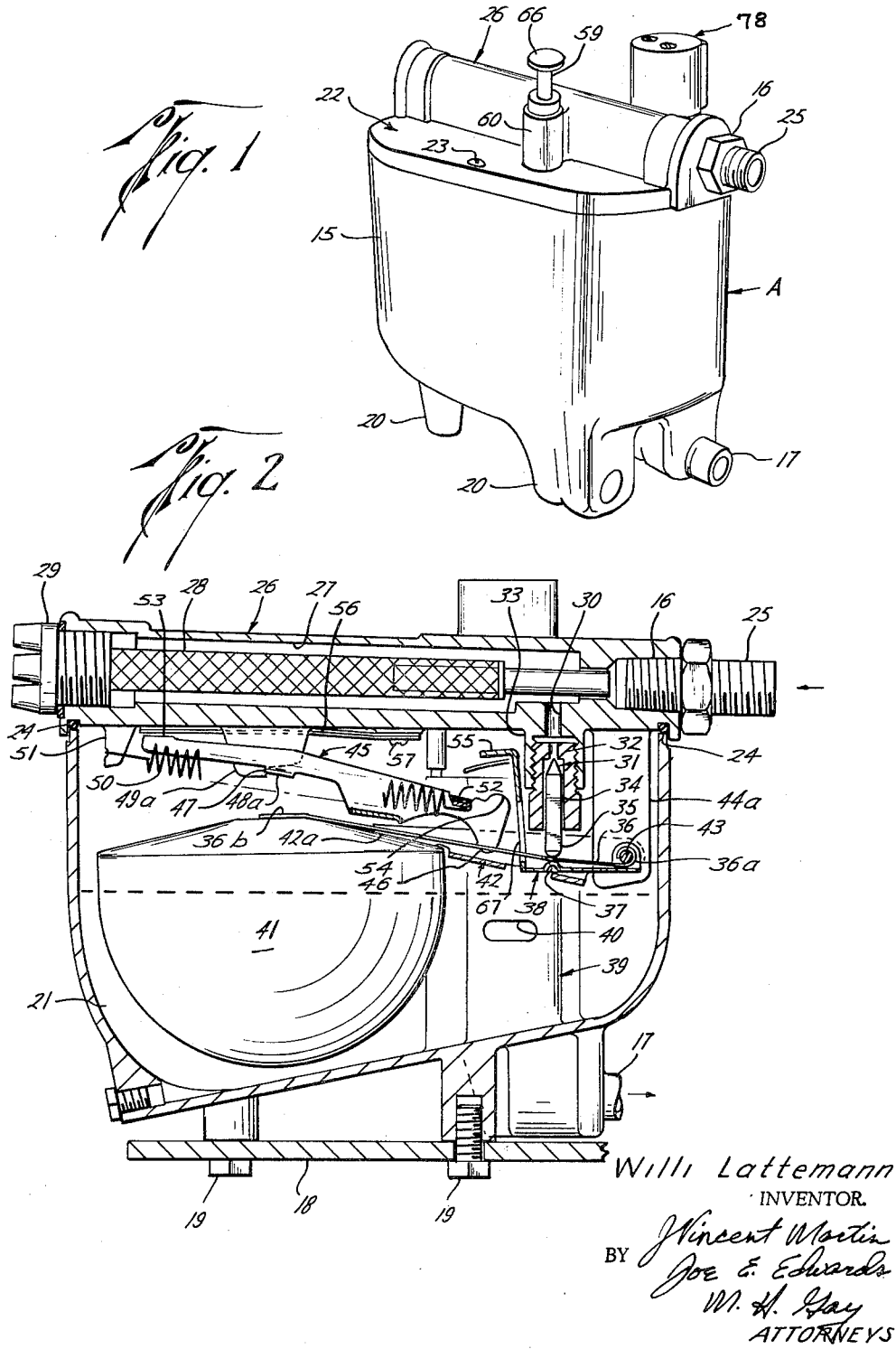

Willi Lattemann
INVENTOR.

BY J. Vincent Martin
Joe E. Edwards
M. H. Gay
ATTORNEYS

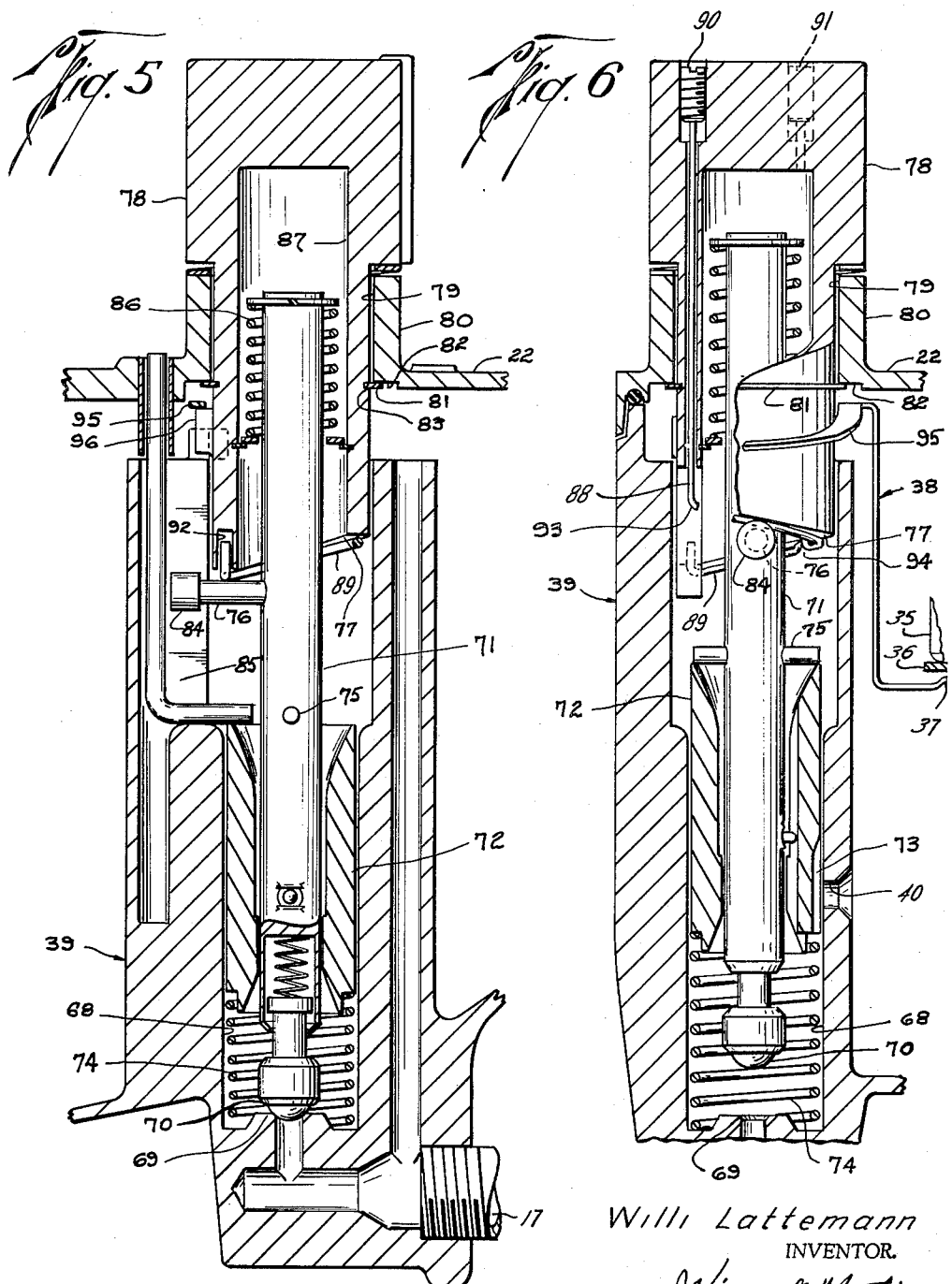

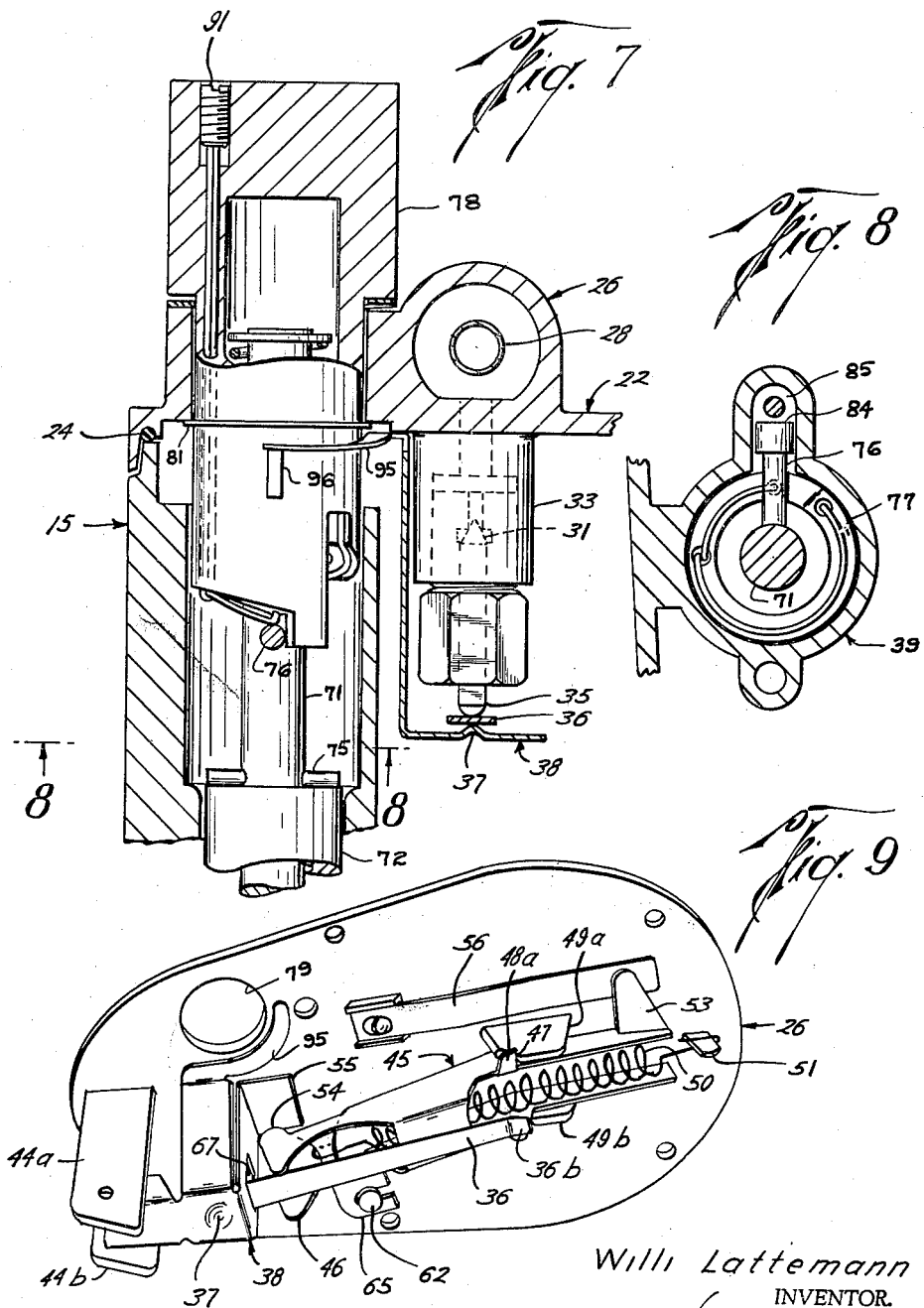

United States Patent Office 3,196,899
Patented July 27, 1965

3,196,899
FEED CONTROL DEVICES
Willi Lattemann, Darmstadt, Germany, assignor to Mission Manufacturing Company, Houston, Tex., a corporation of Texas
Filed Jan. 19, 1962, Ser. No. 167,309
8 Claims. (Cl. 137—389)

This invention relates to feed control devices, and more particularly it relates to such devices for liquid fuel burners.

It is an object of this invention to provide a feed control device incorporating an operating means which is actuated by either a float mechanism or a temperature responsive means for closing the inlet valve of such device.

It is also an object of this invention to provide a device of the character described wherein the aforesaid operating means is a spring-biased lever member for effecting positive snap action closing of the inlet valve.

It is another object of this invention to provide a device of the character described wherein the temperature responsive means is a bimetallic strip located inside the device and responsive to the temperature therein, said strip having operative connection with the operating means to effect closing of the inlet valve when the temperature within the chamber rises to a predetermined point.

It is another object of this invention to provide a feed control device including a bimetallic viscosity compensator coacting with a float mechanism to apply more or less load to the float in response to changes in the viscosity of the liquid within the float chamber.

It is another object of this invention to provide a feed control device wherein an operating lever coacts with an inlet valve closing lever to control closing of the inlet valve when the operating lever is actuated; said valve closing lever being actuated through the operating lever either by a float mechanism or by a temperature responsive element in the liquid chamber or being actuated by the outlet valve closing means, whereby any one of said three controls will effect closing of the inlet valve.

It is still another object of this invention to provide a feed control device of the character described wherein the various operating parts or components of the device are part of or connected to the cover member of the device whereby removal of such cover member renders said parts or components readily accessible for repair or replacement.

The construction designed to carry out this invention will be hereinafter described, together with other features thereof.

Figure 3:
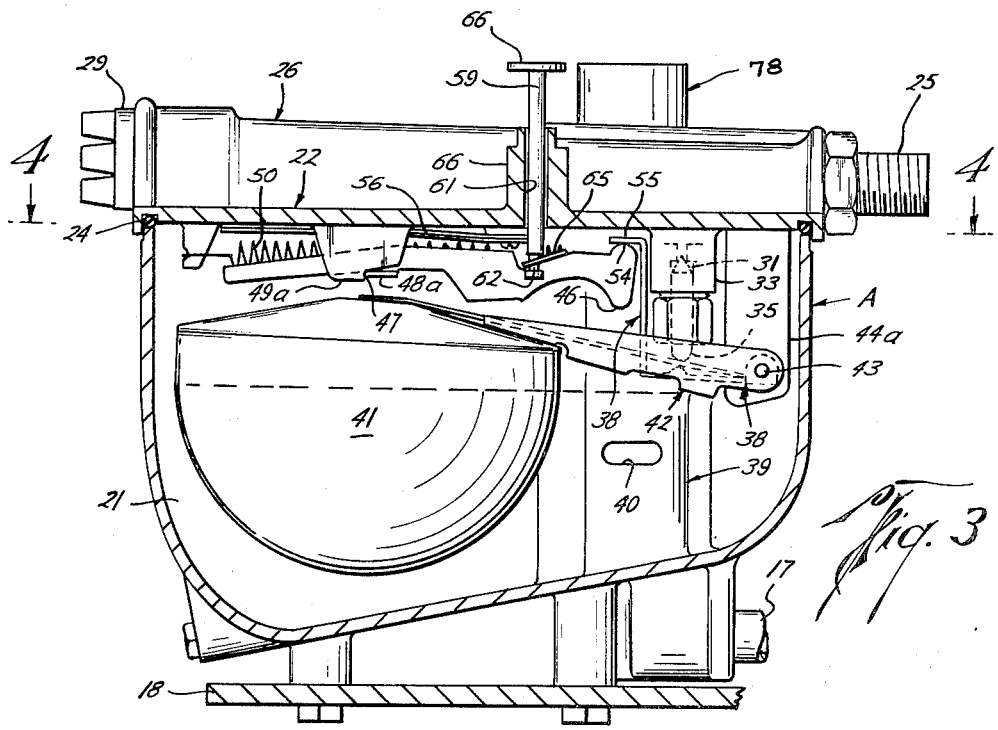
Figure 4:
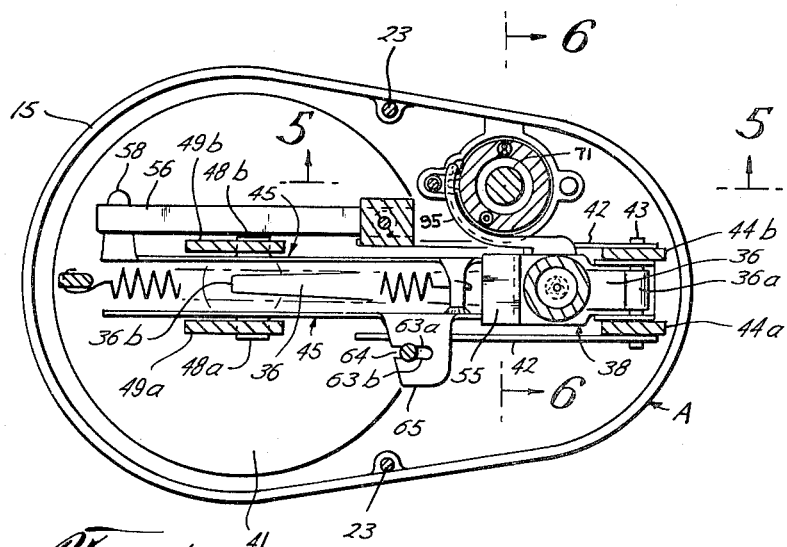

This invention will be readily understood from a reading of the following detailed description and by reference to the drawings forming a part thereof, wherein:

FIGURE 1 is an isometric view of a feed control device constructed in accordance with this invention, FIGURE 2 is a vertical section taken through the control device and illustrating the relative positions of the various parts when the inlet valve is in the open position, FIGURE 3 is a view, partly in section and partly in elevation, illustrating the relative positions of the various parts when the float has actuated the operating means and the inlet valve is closed;

FIGURE 4 is a sectional plan view taken along the line 4—4 of FIGURE 3,

FIGURE 5 is a partial sectional view taken along line 5—5 of FIGURE 4 illustrating the outlet valve in the closed position, FIGURE 6 is a partial sectional view taken along line 6—6 of FIGURE 4 illustrating the outlet valve in the open position, FIGURE 7 is a partial sectional view similar to FIGURE 6, but illustrating the outlet valve in the closed position, together with the mechanism for closing the inlet valve when the outlet valve is closed, FIGURE 8 is a horizontal sectional view taken along line 8—8 of FIGURE 7, and FIGURE 9 is an isometric view of the underside of the cover for the device illustrating the parts attached to such cover, with the exception of the outlet valve and float mechanism.

In the drawings (FIGURE 1), the letter A designates the feed control device of the present invention, which device includes a housing 15 having a liquid fuel inlet 16 and liquid fuel outlet 17. The device may be mounted on a suitable support 18 by screws 19 engaging the bosses 20 located on the bottom of the housing 15.

The housing 15 forms a liquid chamber 21 which functions as a liquid reservoir. The open upper end of the housing and the chamber formed therein are closed by a cover member or plate 22 which is secured to the housing by screws 23 and a suitable sealing gasket 24 is interposed between the upper edge of the housing and the cover.

A supply conduit or pipe (not shown) is connected to liquid inlet 16 by the threaded coupling member 25. A horizontally-disposed boss 26 is formed as a part of the cover plate 22 and has a horizontal opening 27 extending therethrough which communicates with the fuel inlet 16. A suitable filter element or screen 28 may be located within the opening 27 whereby the liquid entering the device is filtered before passing to the liquid chamber 21. A threaded plug member 29 is provided in the end of the opening 27 opposite the fuel inlet 16, such plug member rendering the filter element 28 readily accessible for repair or replacement. A passage 30 formed to extend vertically in the cover 22 establishes fluid communication between the opening 27 in said boss and the liquid chamber 21, and a main inlet valve 31 is mounted to control flow through the passage 30 into the chamber.

The inlet valve 31 which controls the admission of liquid into the chamber 21 includes a tubular valve seat member 32 which is threaded into a depending collar 33 formed on the underside of the cover 22 and which has the lower end of its bore communicating with the chamber. A cylindrical valve element or stem 34 has a loose fit in the bore of the seat member and its upper end is adapted to be moved upwardly to engage the seating member 32 to shut off the flow from the passage 30 to the liquid chamber 21. The lower end 35 of the valve element 34 preferably rests upon a viscosity compensating member 36, but if the viscosity compensating member is not employed, the valve element will engage a boss 37 formed in an intermediate lever 38 which underlies said compensating member and which has one end pivot on a transverse pivot pin 43.

Liquid fuel is directed from the reservoir or chamber 21 through an outlet cylinder 39 which extends vertically within the chamber 21 and which has its lower end in communication with the outlet 17. The liquid from the chamber 21 enters the outlet cylinder 39 through a radial port 40 which is formed in the wall of said cylinder. An outlet control valve, which will be hereinafter described is disposed within the cylinder 39 for metering the flow to the outlet 17.

A float 41 is disposed within the chamber 21 and is supported therein by the float yoke 42. One end of the float yoke 42 engages the float, as at 42a, while the other end of said yoke is pivotally mounted upon the transverse pivot pin 43, said pivot pin passing through and being supported by the depending flanges 44a and 44b, formed on the underside of the cover 22.

An operating mechanism is provided for closing the inlet valve 31 when the float reaches a predetermined position due to the liquid level within the chamber 21. This operating mechanism includes a lever member or arm 45 having a depending portion 46 at one end thereof, which portion is engaged by the float yoke 42 as the liquid level approaches the predetermined point at which the inlet valve is to be closed. The lever 45 is pivotally mounted about pivot point 47 through engagement of the ears 48a and 48b on the lever 45 with the shoulders 49a and 49b depending from the underside of the cover 22. One end of a spring 50 is secured to the depending lug 51 formed on the underside of the cover 22, and the other end of the spring 50 is secured to the lever 45 at a point 52 on the side of the pivot point 47 opposite the depending lug 51. The spring 50 is stretched or elongated when secured at both ends so that the ears 48a and 48b on the lever 45 are held in engagement with the shoulders 49a and 49b. With this arrangement, the usual pivot pin is not necessary since the spring 50 holds and supports the lever arm 45 in engagement with its fulcrum point 47 thereby greatly simplifying manufacture and assembly of the device. An upwardly extending portion 53 on the lever arm 45 engages the underside of the cover 22 and prevents further pivoting of the lever 45 and holds it in the cocked position as shown in FIGURE 2.

The float 41 rises with the liquid level until the float yoke 42 contacts the depending portion 46 on the lever 45, and, as the float continues to rise, the lever 45 pivots about the pivot point 47 until the direction of force applied by the spring 50 moves past center, after which said force causes the righthand end of the lever 45 (as viewed in FIGURE 2) to snap upwardly.

As the end of the lever 45 snaps upwardly under the force of the spring 50, the upset portion 54 disposed on that end of the lever 45 on which the depending portion 46 is located, engages an angular projection 55 on the intermediate lever 38 which lever is also pivotally supported by the pivot pin 43. The boss 37 on the intermediate lever 38 moves upwardly as the intermediate lever 38 pivots about the pivot pin 43 and engages the bottom of the valve element and forces said valve element into sealing engagement with the valve seat member 32 thereby shutting off flow through the inlet valve 31.

A bimetallic thermostatic element 56 provides the preferred means whereby the operating mechanism may be actuated to close the inlet valve in response to an increase in temperature of the element itself, the temperature increase being generated or caused, for instance, by an increase in the temperature of the fuel within the chamber 21 or by an increase in the temperature of the cover 22 due to a fire outside of the device. The thermostatic element 56 extends in generally parallel relation to the underside of the cover 22 and is secured thereto at one end by the screw 57. As best seen in FIGURE 4, the other end of the thermostatic element overlies a projection 58 which extends laterally from one side of the lever member 45. As the temperature increases, the bimetallic element is distorted and the free end moves downwardly into contact with the projection 58 to thereby force the lefthand end of the lever member 45 (as viewed in FIGURE 2) downwardly and the opposite end of such lever upwardly as it pivots about the pivot point 47. As has been noted, when the force applied by the spring causes the end of the lever arm 45 to snap upwardly, the intermediate lever 38 is engaged by said lever arm and rotates about its pivot point 43, engages the valve element 35, and closes the inlet valve 31. Although the bimetallic element 56 is shown attached to the cover and is responsive to the temperature within the device, it is obvious that other well-known temperature devices responsive to the temperature either inside or outside of the device could be employed to actuate the operating mechanism.

There is thus provided a positive snap-action operating mechanism for closing the inlet valve; the single operating mechanism being actuated by either a liquid level sensitive means, such as a float, or a temperature responsive means, such as the bimetallic strip 56.

After the spring-biased lever 45 has been tripped, it may be reset so that the inlet valve is opened by depressing an externally-accessible plunger 59 (FIGURES 3 and 4). This plunger 59 extends through a boss 60 having a bore 61 therethrough in the cover 22. The lower end of the plunger 59 is provided with a peripheral groove 62 which engages the edges 63a and 63b of a slot 64 formed in an arm 65 extending laterally from one side of the lever 45.

The button 66 secured to the end of the plunger 59 outside of the device may also visually indicate whether or not the operating mechanism has been tripped; if the button is adjacent the top of the boss 60, then the lever 45 is depressed and the inlet valve is open; if the button 66 is elevated above the top of the boss (FIGURE 3), then the lever 45 has been actuated or tripped and the inlet valve is closed.

The viscosity compensating member 36 is a bimetallic temperature responsive element which tends to curl or shorten as its temperature increases. One end 36a of the viscosity compensator 36 is secured to the pivot pin 43 while the other end 36b extends through an opening or window 67 in the intermediate lever 38 and then engages the float 41. As the temperature increases and the viscosity of the liquid decreases, then the compensator 36 bends or curls whereby the end 36b tends to move downwardly and apply more force to the float 41, so that it rides lower in the liquid in the chamber 21. The liquid level in the chamber 21 may therefore rise to a higher point within such chamber before the operating mechanism is tripped by the float 41 to close the inlet valve. A greater pressure head is then available for forcing the liquid through the outlet 17, and an increased volume of liquid will flow out of the device for a given opening of the outlet valve to thereby compensate for the decreased viscosity of the liquid. As the viscosity compensating member 36 coacts with the float 41 and is separate and distinct from the operating mechanism which closes the inlet valve, then such operating mechanism will not be affected in the event the viscosity compensating member is not employed in the device.

As has been noted, an outlet valve is disposed within the vertical cylinder 39 and such valve is shown in detail in FIGURES 5 and 6. The outlet valve is located within the bore 68 of the cylinder 39 and includes a valve seat 69 formed in the bottom of the bore 68 and a spring loaded valve member 70. For imparting vertical movement to the valve 70 so that it may be seated and unseated, an actuating rod 71 is provided to which the spring loaded valve member 70 is attached. A metering sleeve 72 is disposed within the bore 68 and surrounds the actuating rod 71, said sleeve being provided with a tapering groove 73 adjacent the port 40 so that the fluid passing through such port is metered before passing through the outlet 17. A spring 74 disposed within the bore 68 below the sleeve 72 forces such sleeve upwardly into engagement with a pin 75 extending radially through the actuating rod 71 thereby tending to force such rod upwardly and the attached valve 70 out of engagement with the valve seat 69.

A second pin 76 located above the pin 75 extends radially from the actuating rod 71 and engages the cam surface 77 on the bottom of the rotatable control knob 78. This control knob 78 extends through the bore 79 in the boss 80 projecting outwardly from the cover 22; said control knob being held in place by snap ring 81 engaging shoulder 82 on the boss 80 and a snap ring groove 83 on the knob 78.

The pin 76 has an enlarged end portion 84 which engages the walls of slot 85 in the vertical cylinder 39 whereby the pin 76 and rod 71 may move vertically but will not rotate. As the control knob is rotated, a cam surface 77 forces the actuating rod 71, the attached valve member 70, and the metering sleeve 72 to move vertically whereby the liquid is properly metered and the outlet valve is opened or closed.

A second spring 86 disposed within the counter bore 87 in the control knob 78 coacts with the actuating rod 71 and the cotrol knob 78 to maintain the pin 76 in engagement with the cam surface 77 whereby the actuating rod 71 is lifted out of the cylinder 39 when the cover 22 is removed.

Wires 88 and 89 disposed adjacent the cam surface 77 provide a means whereby the maximum and minimum opening of the outlet valve may be adjusted from the exterior of the device. The wire 88 extends partially through the control knob 78 from engagement with the set screw 90 (accessible from outside the device) along a portion of the cam surface 77 and thence upwardly partially through the control knob 78 into engagement with a second set screw 91, also accessible from the exterior of the device. The second wire 89 extends downwardly from engagement with the set screw 91 along the remaining portion of the cam surface 77 and is secured to the control knob 78 in the recess 92. The point 93 on the wire 88, which point is adjacent the highest point on the cam surface 77, is thus variable with the set screw 90 so that the maximum open position of the outlet valve may be varied by adjustment of the set screw 90. Similarly, the point 94 formed by the wires 88 and 89 where they both turn upwardly through the control knob 78 may be moved vertically when the set screw 91 is turned, whereby the minimum open position of the outlet valve may be varied.

The means for closing the inlet valve 31 as the outlet valve is closed includes a sloping arcuate projection 95 coacting with a radial lug 96 formed on the control knob 78. The projection 95 is formed on the upper end of the intermedite lever 38 near the extension or flange 55 and extends at least partially around that portion of the control knob 78 which is within the cylinder 39 (FIGURE 4). As the control knob is rotated, the lug 96 engages the underside of the projection 95 and, due to the downwardly sloping configuration of such projection, lifts the intermediate lever 38 whereby the boss 37 on the intermediate lever 38 engages the inlet valve stem 35 and closes the inlet valve 31 when the control knob 78 is rotated sufficiently to close the outlet valve (FIGURE 7).

The inlet valve 31 may therefore be closed through actuation of the spring-biased lever 45 by either the float mechanism or the temperature responsive member, or by closing of the liquid outlet valve.

As has been discussed, the major parts for components of the device are attached to the cover 22 so that such parts are lifted out of the housing 15 when the cover 22 is removed. This obviously renders the device and its individual parts readily accessible for servicing. FIGURE 9 is an isometric view illustrating this feature of the invention; the actuating rod 71, the control knob 78, and the float mechanism, which are preferably secured to the cover 22, having been removed for clarity.

The foregoing disclosure and description of the invention is illustrative and explanatory thereof, and various changes in the size, shape and material, as well as in the details of the illustrated construction, may be made within the scope of the appended claims without departing from the spirit of the invention.

What is claimed is:

1. A feed control device comprising,
a housing having a chamber therein,
an inlet passage having communication with said chamber for supplying liquid to said chamber,
an inlet valve coacting with said inlet passage for controlling flow through said inlet passage,
an outlet passage having communication with said chamber for conveying liquid from said chamber,
an outlet valve coacting with said outlet passage for controlling flow through such passage,
outlet valve closing means for closing said outlet valve to stop flow through said outlet passage,
operating means for closing said inlet valve to stop flow through said inlet passage,
float means having operative connection with said operating means for actuating such means to close said inlet valve in response to the liquid level within said chamber,
temperature responsive means having operative connection with said operating means for actuating said means to close said inlet valve in response to temperature conditions,
and a second operating means coacting with said inlet valve and said outlet valve closing means for closing said inlet valve substantially simultaneously as said outlet valve is closed by said outlet valve closing means.

2. A feed control device comprising,
a housing having a chamber therein,
an inlet passage having communication with said chamber for supplying liquid to said chamber,
an inlet valve coacting with said inlet passage for controlling flow through said inlet passage,
stationary fulcrum means secured to said housing,
a lever member disposed within said chamber and adapted to coact with said inlet valve to close said inlet valve to stop flow through said inlet passage,
said lever member having a fulcruming projection adapted to coact with said stationary fulcrum means whereby said lever member may fulcrum about said stationary member,
resilient means secured to said housing and said lever member and exerting its force in a direction to maintain said fulcruming projection in contact with said stationary fulcrum means,
float means having operative connection with said lever member for actuating said lever member to close said inlet valve in response to the liquid level within said chamber,
and a temperature-responsive strip of bimetallic material secured at one end thereof to the interior of said housing,
the other end of said temperature-responsive strip having operative connection with said lever for actuating said lever member to close said inlet valve in response to temperature conditions.

3. A feed control device as set forth in claim 2, together with,
a viscosity compensating means coacting with said float means to apply a force to said float means in accordance with viscosity conditions of the liquid within said chamber whereby the position of said float in the liquid within said chamber is controlled in accordance with variations in the viscosity of said liquid.

4. A feed control device comprising,
a housing having a chamber therein,
an inlet passage having communication with said chamber for supplying liquid to said chamber,
an inlet valve coacting with said inlet passage for controlling flow through said inlet passage,
stationary fulcrum means secured to said housing,
a lever member disposed within said chamber and adapted to coact with said inlet valve to close said inlet valve to stop flow through said inlet passage,
said lever member having a fulcruming projection adapted to coact with said stationary fulcrum means whereby said lever member may fulcrum about said stationary member,
resilient means secured to said housing and said lever member and exerting its force in a direction to maintain said fulcruming projection in contact with said stationary fulcrum means,
and a temperature-responsive strip of bimetallic material secured at one end thereof to the interior of said housing,
the other end of said temperature-responsive strip having operative connection with said lever member for actuating said lever member to close said inlet valve in response to temperature conditions within the interior of said housing.

5. A feed control device comprising,
a housing having a chamber therein,
an inlet passage having communication with said chamber for supplying liquid to said chamber,
an inlet valve seat disposed within said inlet passage,
an inlet valve member adapted to seat in sealing engagement with said inlet valve seat whereby flow through said inlet passage may be shut off,
an intermediate lever pivotally secured to said housing and adapted to move said inlet valve member into sealing engagement with said inlet valve seat,
stationary fulcruming means secured to said housing,
a lever member disposed within said chamber and adapted to coact with said intermediate lever to move said inlet valve member into sealing engagement with said inlet valve seat,
said lever member having a fulcruming projection adapted to coact with said stationary fulcrum member whereby said lever member may fulcrum about said stationary member to thereby actuate said intermediate lever,
resilient means secured to said housing and said lever member and exerting its force in a direction to maintain said fulcruming projection on the lever member in contact with said stationary fulcrum means,
and float means having operative connection with said lever member for actuating said lever member to thereby engage said intermediate lever and move said inlet valve member into sealing engagement with said inlet valve seat.

6. A feed control device comprising,
a housing having a chamber therein,
an inlet passage having communication with said chamber for supplying liquid to said chamber,
an inlet valve seat disposed within said inlet passage,
an inlet valve member adapted to seat in sealing engagement with said inlet valve seat whereby flow through said inlet passage may be stopped,
an intermediate lever pivotally secured to said housing and engageable with said valve member to move same into sealing engagement with said inlet valve seat,
stationary fulcrum means secured to said housing and extending into the chamber,
a lever member disposed within said chamber and coacting with said intermediate lever whereby said intermediate lever is operated to close the inlet valve,
said lever member having a fulcruming projection adapted to coact with said stationary fulcrum means whereby said lever member may fulcrum about said stationary member to operate said intermediate lever,
resilient means secured to said housing and said lever member and exerting its force in a direction to maintain said fulcruming projection on the lever member in contact with said stationary fulcrum means,
and temperature responsive means having operative connection with said lever member for actuating said lever member to operate said intermediate lever and thereby move said inlet valve member into sealing engagement with said inlet valve seat in response to temperature conditions.

7. A feed control device comprising a housing having a chamber therein,
an inlet passage having communication with said chamber for supplying liquid to said chamber,
an inlet valve coacting with said inlet passage for controlling flow through said inlet passage,
operating means for closing said inlet valve to stop flow through said inlet passage,
float means having operative connection with said operating means for actuating said operating means to close said inlet valve in response to the liquid level within said chamber,
a temperature-responsive bimetallic strip disposed within said chamber and having operative connection with said operating means for actuating said operating means to close said inlet valve in response to temperature conditions,
and a viscosity compensating means coacting with said float means to apply a force to said float means in accordance with viscosity conditions of the liquid within said chamber whereby the position of said float means in the liquid within said chamber is controlled in accordance with variations in the viscosity of said liquid.

8. A feed control device comprising,
a housing having a chamber therein,
an inlet passage having communication with said chamber for supplying liquid to said chamber,
an inlet valve coacting with said inlet passage for controlling flow through said inlet passage,
operating means for closing said inlet valve to stop flow through said inlet passage,
float means having operative connection with said operating means for actuating said operating means to close said inlet valve in response to the liquid level within said chamber,
and a temperature-responsive bimetallic strip disposed within said chamber and having operative connection with said operating means for actuating said operating means to close said inlet valve in response to temperature conditions,
said float means and said temperature-responsive bimetalic strip being operable independently of each other.

References Cited by the Examiner
UNITED STATES PATENTS

| 2,118,443 | 5/38 | McCorkle | 251—11 |
| 2,317,556 | 4/43 | Russel | 137—400 |
| 2,336,730 | 12/43 | Hayter | 137—389 XR |
| 2,338,319 | 1/44 | De Lancey | 137—400 |
| 2,547,995 | 4/51 | Biermann | 137—400 |
| 2,591,581 | 4/52 | Millerwise | 137—400 |
| 2,825,508 | 3/58 | Velan et al. | 236—59 XR |

ISADOR WEIL, *Primary Examiner.*

M. CARY NELSON, WILLIAM F. O'DEA, *Examiners.*